United States Patent [19]

Tsuchida

[11] Patent Number: 5,218,475
[45] Date of Patent: Jun. 8, 1993

[54] ATTACHMENT LENS SYSTEM

[75] Inventor: Hirofumi Tsuchida, Tokyo, Japan

[73] Assignee: Olympus Optical Co., Ltd., Tokyo, Japan

[21] Appl. No.: 687,026

[22] Filed: Apr. 18, 1991

[30] Foreign Application Priority Data

Apr. 19, 1990 [JP] Japan .................. 2-101727

[51] Int. Cl.$^5$ ............................................. G02B 15/02
[52] U.S. Cl. ..................................... 359/673; 359/672; 359/675
[58] Field of Search ............... 350/409, 422, 423, 437; 359/672, 673, 674, 675, 684, 683

[56] References Cited

U.S. PATENT DOCUMENTS

| 4,391,493 | 7/1983 | Tajima et al. | 359/673 |
| 4,810,071 | 3/1989 | Tsuchida et al. | 350/422 |
| 4,818,083 | 4/1989 | Mihara | 350/423 |

FOREIGN PATENT DOCUMENTS

| 53-27044 | 3/1978 | Japan . | |
| 62-194213 | 8/1987 | Japan | 359/673 |
| 1-251009 | 10/1989 | Japan . | |
| 1-319010 | 12/1989 | Japan . | |

Primary Examiner—Bruce Y. Arnold
Assistant Examiner—Hung Xuan Dang
Attorney, Agent, or Firm—Cushman, Darby & Cushman

[57] ABSTRACT

An attachment lens system comprising, in the order from the object side, a first lens unit having a positive refractive power and a second lens unit having a negative refractive power; having a negative refractive power as a whole; and adapted in such a manner that magnification thereof is changed by moving at least one of the first lens unit and the second lens unit along the optical axis so as to vary the airspace reserved between these lens units. This attachment lens system composes a lens system having a high vari-focal ratio when combined with a master lens system.

3 Claims, 5 Drawing Sheets

FRONT LENS UNIT

REAR LENS UNIT

FOCUSING SUBUNIT

1st LENS UNIT

2nd LENS UNIT

ATTACHMENT LENS SYSTEM

BACKGROUND OF THE INVENTION a) Field of the invention

The present invention relates to an attachment lens system which is to be used in combination with photographic lens systems for cameras.

b) Description of the prior art

In the recent days, zoom lens systems are widely used as photographic lens systems for photographic cameras, video cameras and so on. However, the zoom lens systems have a common defect that they must be composed of large numbers of lens elements for correcting aberrations and therefore have large external designs, thereby enlarging the cameras which are to comprise these zoom lens systems.

On the other hand, it is possible to design a compact camera by using a photographic lens system which has a fixed focal length. However, such a lens system has another defect that it has only one field angle, thereby limiting photographing variety.

The defects described above can be corrected, or a great photographing variety can be obtained with a compact photographic lens system, by equipping a camera with a master lens system having a fixed focal length and combining it with an attachment lens system which permits varying focal length of the photographic lens system as occasion demands.

As an example of attachment lens systems which are designed for use at the tele position, there is known the attachment lens system disclosed by Japanese Patent Kokai Publication No. Hei 1-251009. This attachment lens system is designed, as shown in FIG. 1B, as an afocal lens system which comprises, in the order from the object side, a lens unit having a positive refractive power and another lens unit having a negative refractive power, and is to be arranged before a master lens system, at the location enclosed by the dashed line in FIG. 1A, for permitting variation of focal length of the master lens system.

Further, as an example of attachment lens systems to be used at the wide position, there is known the lens system proposed by Japanese Patent Kokai Publication No. Hei 1-319010 which is designed as an afocal lens system comprising, in the order from the object side, a lens unit having a negative refractive power and another lens unit having a positive refractive power.

However, each of these conventional examples is an attachment lens system which has a fixed focal length and a magnification within a range of approximately from 0.5× to 3.0×, and permits the photographing variety within a certain limited range.

Furthermore, it is possible to obtain a higher magnification by using an afocal lens system of the Keplerian type as an attachment lens system. However, the attachment lens system of this type poses a problem that it extremely prolongs the total length of the photographic lens system which is composed by combining the attachment lens system with a master lens system.

In addition, there are known the attachment lens systems which are designed as afocal zoom lens systems each of which consists of three lens units, i.e., a positive lens unit, a negative lens unit and a positive lens unit, as exemplified by the lens system disclosed by Japanese Patent Kokai Publication No. Sho 53-27044. However, this attachment lens system has a low zooming ratio of approximately 2 which is not sufficient for enhancing the photographing variety.

SUMMARY OF THE INVENTION

A primary object of the present invention is to provide a zoom type of attachment lens system which has a high zooming ratio and is to be used in combination with a master lens system having a single focal length.

The attachment lens system according to the present invention comprises a first lens unit having a positive refractive power and a second lens unit having a negative refractive power, designed for use in combination with a master lens system with the first lens unit arranged on the object side, has a negative refractive power as a whole, and is adapted so as to vary focal length of the total photographic lens system as a whole by moving at least one of the first lens unit and the second lens unit along the optical axis so as to vary the airspace reserved between the first lens unit and the second lens unit.

Further, it is more desirable that the attachment lens system according to the present invention is designed in such a manner that it is to be combined with a master lens system which comprises a front lens unit having a negative refractive power and a rear lens unit having a positive refractive power, and that it composes a photographic lens system, with the front lens unit of the master lens unit removed and the first lens unit of the attachment lens system located on the object side, of the attachment lens system and the rear lens unit of the master lens unit.

The conventional attachment lens system, for example that designed for use at the tele position, is an afocal lens system which is to be arranged before a master lens system. Further, the conventional zoom type attachment lens system consists of a first positive lens unit and a second negative lens unit, and is designed basically as an afocal lens system which is adapted so as to vary magnification thereof by varying the airspace reserved between these lens units.

Since it is necessary for such an afocal lens system to design it so as to have a refractive power of approximately zero as a whole, the negative lens unit cannot have so strong a refractive power and the attachment lens system cannot have a high zooming ratio. Though it is conceivable to design the first lens unit so as to have a negative refractive power, such a design is undesirable for prolonging focal length of the total photographic lens system which is to be composed by combining the afocal lens system with a master lens system.

The attachment lens system according to the present invention comprises the first lens unit having the positive refractive power and the second lens unit having the negative refractive power as shown in FIG. 2B, and is designed so as to permit varying the relative distance between these lens units and have a negative refractive power as a whole. This composition makes it possible to strengthen the refractive power of the second negative lens unit and enhance the zooming ratio of the attachment lens system. This will be understood from the fact that the first lens unit and the second lens unit of a zoom lens system which has a high zooming ratio and consisting of four lens unit have a negative total focal length.

A lens system (master lens system) which is to be used in combination with such an attachment lens system having the negative refractive power must be designed so as to converge a diverging light bundle.

On the other hand, a photographic lens system (to be used as a master lens system) is generally designed so as to converge a parallel light bundle. It is therefore impossible to combine the attachment lens system according to the present invention with such a photographic lens system with no modification. Accordingly, a master lens system to be combined with the attachment lens system according to the present invention is composed of a front lens unit having a negative refractive power and a rear lens unit having a positive refractive power as shown in FIG. 3A, and the front lens unit is removed when the attachment lens system according to the present invention is to be used in combination with the master lens system. When the attachment lens system according to the present invention is combined with the master lens system as described above, the rear lens unit having the function to converge a diverging light bundle is arranged after the attachment lens system, thereby composing a photographic zoom lens system very conveniently in practice.

DETAILED DESCRIPTION OF THE PREFERRED EMBODIMENT

Now, the present invention will be described more detailedly below with reference to the preferred embodiment shown in the accompanying drawings and given in the form of the following numerical data:

| Embodiment (attachment lens) f = 6.18 ~ 116.4, F/2.8 ~ F/3.2 maximum image height 4, field angle 2ω = 69.1 ~ 3.9° | | | |
|---|---|---|---|
| $r_1 = 47.4367$ | $d_1 = 1.4000$ | $n_1 = 1.80518$ | $\nu_1 = 25.43$ |
| $r_2 = 29.6084$ | $d_2 = 0.4000$ | | |
| $r_3 = 30.1538$ | $d_3 = 8.6000$ | $n_2 = 1.60311$ | $\nu_2 = 60.70$ |
| $r_4 = 1058.1793$ | $d_4 = 0.2000$ | | |
| $r_5 = 27.1343$ | $d_5 = 5.2000$ | $n_3 = 1.49700$ | $\nu_3 = 81.61$ |
| $r_6 = 74.7297$ | $d_6 = D_1$ (variable) | | |
| $r_7 = 163.2634$ | $d_7 = 1.0000$ | $n_4 = 1.78590$ | $\nu_4 = 44.18$ |
| $r_8 = 7.4338$ | $d_8 = 3.8000$ | | |
| $r_9 = -18.2307$ | $d_9 = 1.0000$ | $n_5 = 1.65160$ | $\nu_5 = 58.52$ |
| $r_{10} = 8.1857$ | $d_{10} = 4.0000$ | $n_6 = 1.80518$ | $\nu_6 = 25.43$ |
| $r_{11} = 42.1155$ | $d_{11} = D_2$ (variable) | | |
| $r_{12} = \infty$ (stop) | | | |

| | f | $D_1$ | $D_2$ | $D_3$ |
|---|---|---|---|---|
| wide | 6.18 | 1.400 | 30.989 | 22.173 |
| standard | 26.8 | 20.233 | 12.156 | 11.743 |
| tele | 116.4 | 29.989 | 2.400 | 17.035 |

-continued $|\phi_2/\phi_1| = 7.43$

| (master lens) f = 12, F/2.8, maximum image height 4 field angle 2ω = 38.7° | | | |
|---|---|---|---|
| $r_1 = 73.5995$ | $d_1 = 1.6000$ | $n_1 = 1.60311$ | $\nu_1 = 60.70$ |
| $r_2 = 13.1708$ | $d_2 = 2.6000$ | | |
| $r_3 = -22.7316$ | $d_3 = 4.0000$ | $n_2 = 1.60311$ | $\nu_2 = 60.70$ |
| $r_4 = 16.9540$ | $d_4 = 5.0000$ | $n_3 = 1.59270$ | $\nu_3 = 35.29$ |
| $r_5 = -141.3424$ | $d_5 = 12.1447$ | | |
| $r_6 = \infty$ (stop) | $d_6 = 1.2000$ | | |
| $r_7 = 30.9708$ | $d_7 = 2.6000$ | $n_4 = 1.60311$ | $\nu_4 = 60.70$ |
| $r_8 = -21.4345$ | $d_8 = 1.0000$ | | |
| $r_9 = -15.4357$ | $d_9 = 1.2000$ | $n_5 = 1.80518$ | $\nu_5 = 25.43$ |
| $r_{10} = -22.5564$ | $d_{10} = 18.7464$ ($D_3$) | | |
| $r_{11} = -35.2138$ | $d_{11} = 2.4000$ | $n_6 = 1.60311$ | $\nu_6 = 60.70$ |
| $r_{12} = -19.9338$ | $d_{12} = 0.2000$ | | |
| $r_{13} = 20.6973$ | $d_{13} = 5.4000$ | $n_7 = 1.53172$ | $\nu_7 = 48.90$ |
| $r_{14} = -15.2692$ | $d_{14} = 1.2000$ | $n_8 = 1.80518$ | $\nu_8 = 25.43$ |
| $r_{15} = -67.7718$ | | | | wherein the reference symbols $r_1$, $r_2$, ... represent the radii of curvature on the surfaces of the respective lens elements, the reference symbols $d_1$, $d_2$, ... designate the thicknesses of the respective lens elements and the airspaces reserved therebetween, the reference symbols $n_1$, $n_2$, ... denote the refractive indices of the respective lens elements, and the reference symbols $\nu_1$, $\nu_2$, ... represent the Abbe's numbers of the respective lens elements.

Figure 1A:
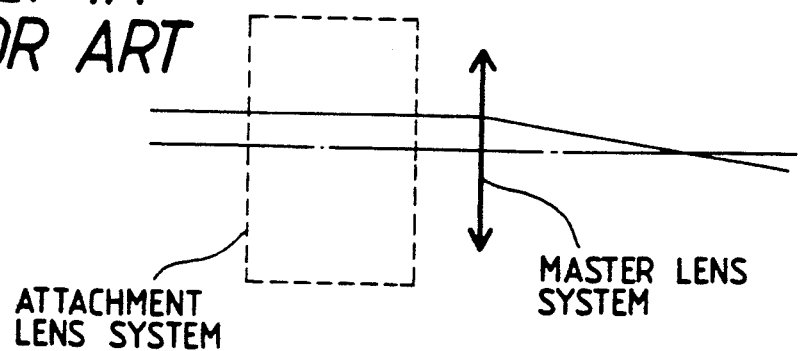
FIG. 1A and FIG. 1B show diagrams illustrating an outline of the conventional attachment lens system.
Figure 1B:
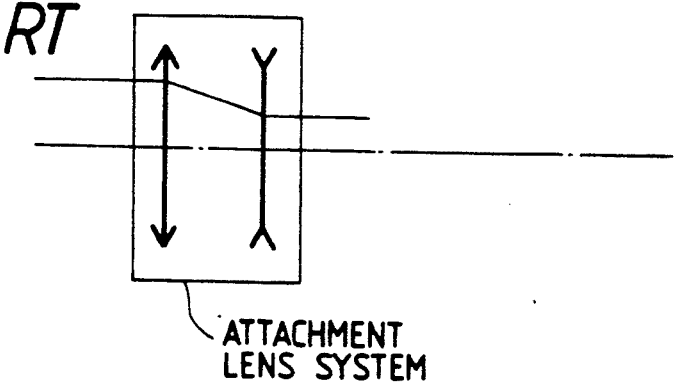
Figure 2A:
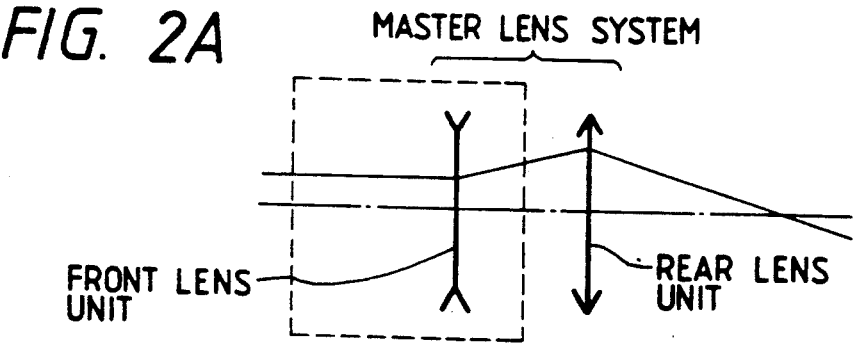
FIG. 2A and FIG. 2B show diagrams illustrating an outline of the composition of the attachment lens system according to the present invention.
Figure 2B:
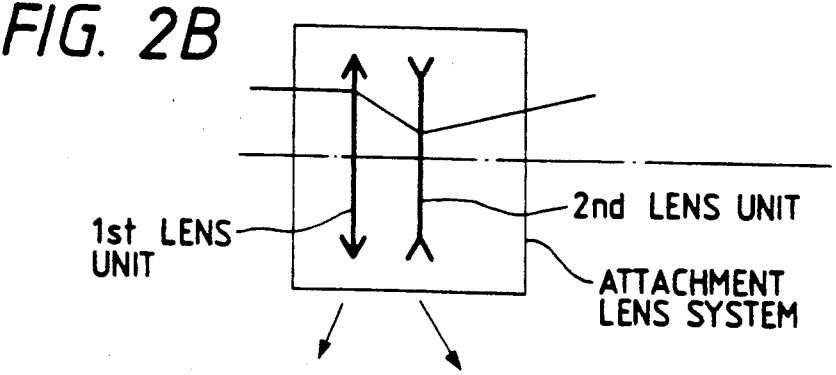
Figure 3A:
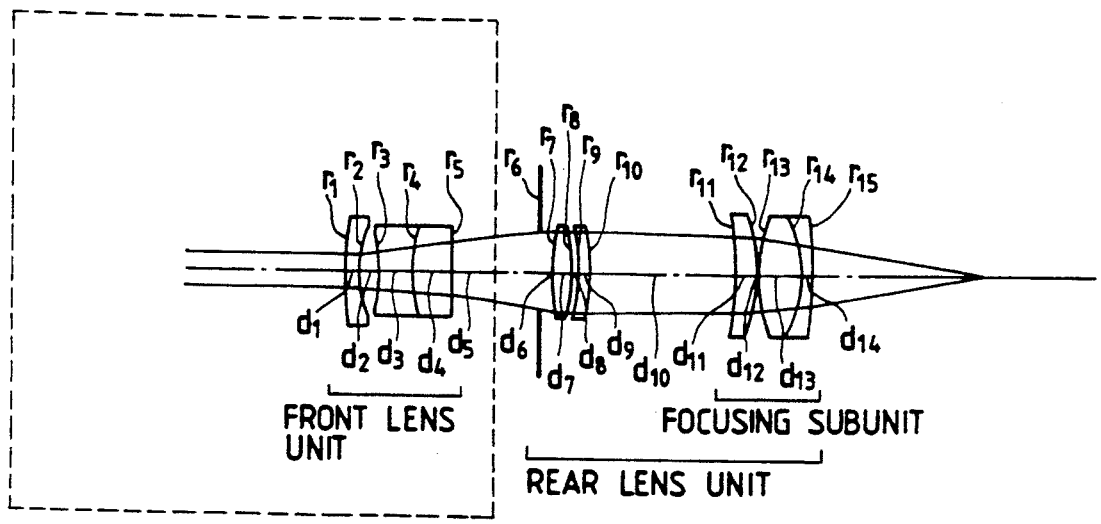
FIG. 3A and FIG. 3B show sectional views illustrating how an embodiment of the attachment lens system according to the present invention is combined with a master lens system.
Figure 3B:
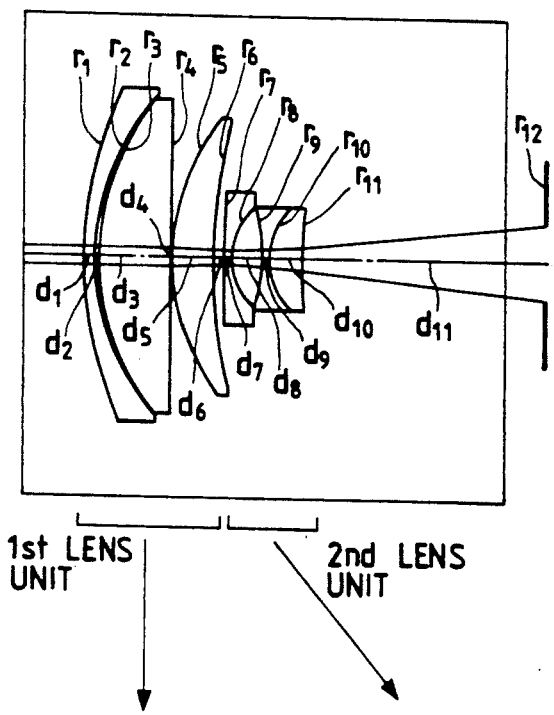

The embodiment of the attachment lens system according to the present invention has the composition illustrated in FIG. 3B, i.e., comprises a first lens unit having a positive refractive power and a second lens unit having a negative refractive power. Further, FIG. 3A shows an example of the master lens system which consists of a front lens unit having a negative refractive power and a rear lens unit having a positive refractive power. In this master lens system, the three lens elements arranged on the image side in the rear lens unit compose a focusing subunit which is to be moved for focusing the total photographic lens system composed of the master lens system and the attachment lens system according to the present invention.

Figure 4:
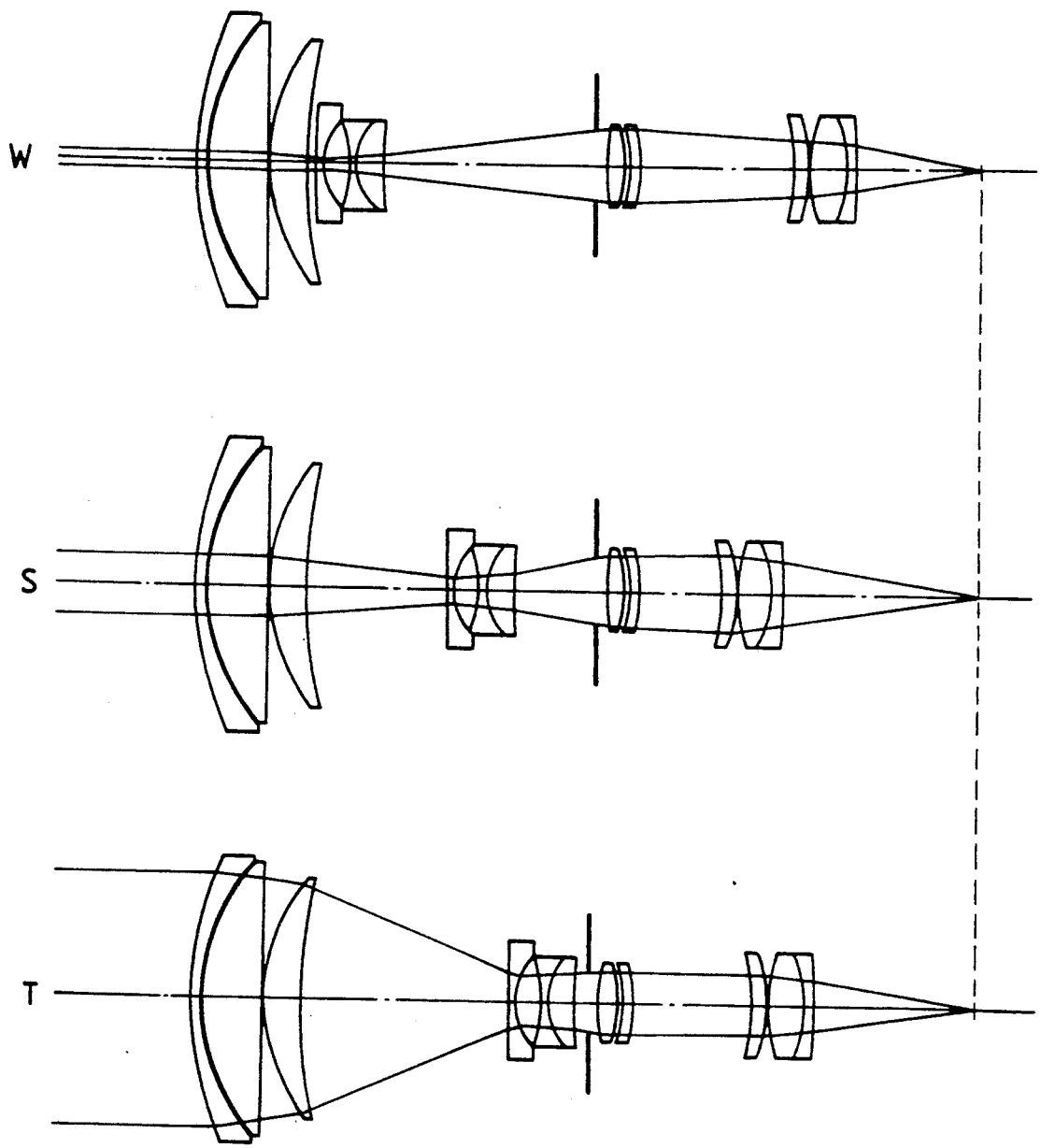
FIG. 4 shows sectional views illustrating zooming positions of the total photographic lens system composed of the master lens system and the embodiment of the present invention shown in FIG. 4.
Figure 5:
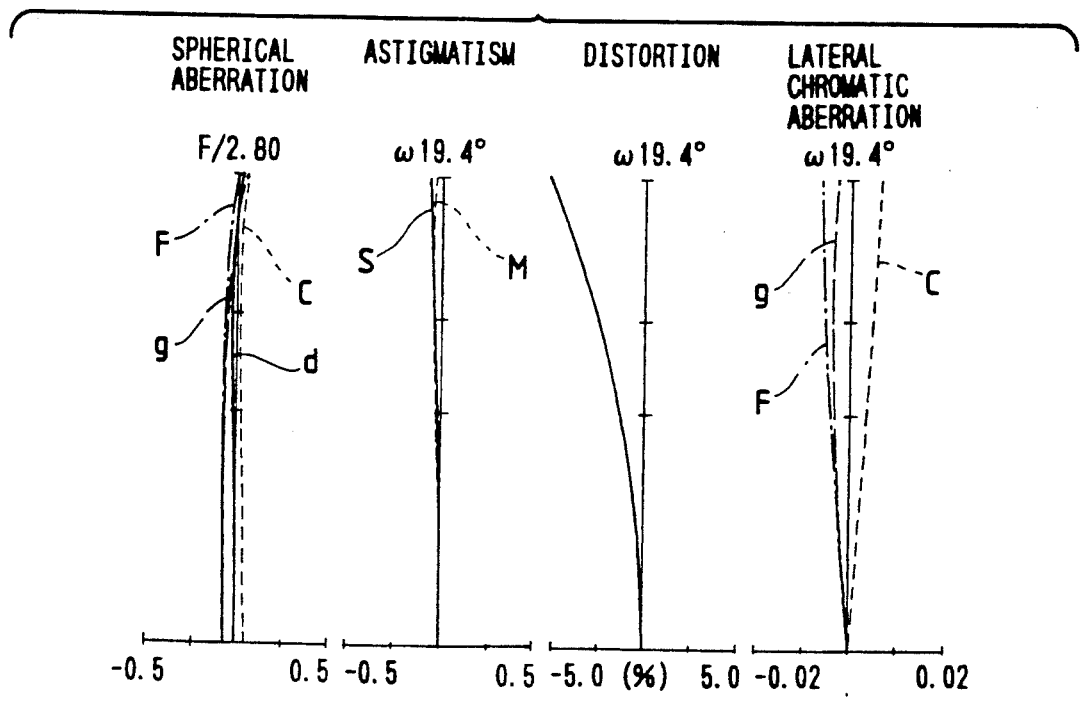
FIG. 5 shows graphs illustrating aberration characteristics of the master lens system.
Figure 6:
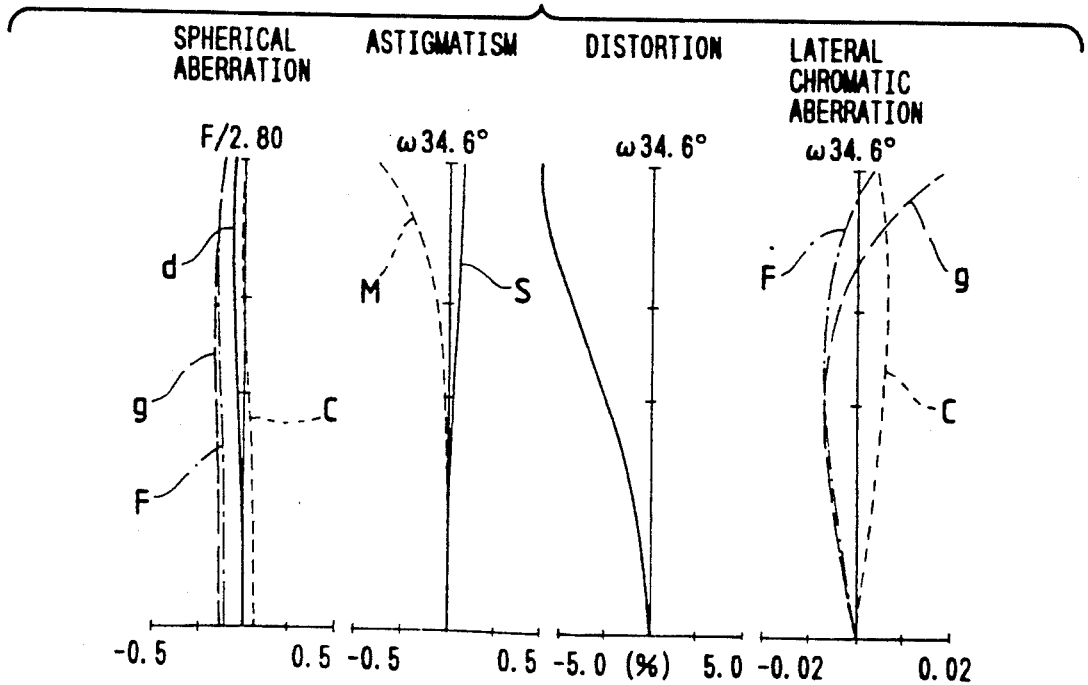
FIG. 6, FIG. 7 and FIG. 8 show curves illustrating aberration characteristics at the wide position, intermediate focal length and tele position respectively of the total photographic lens system composed of the master lens system and said embodiment of the present invention.
Figure 7:
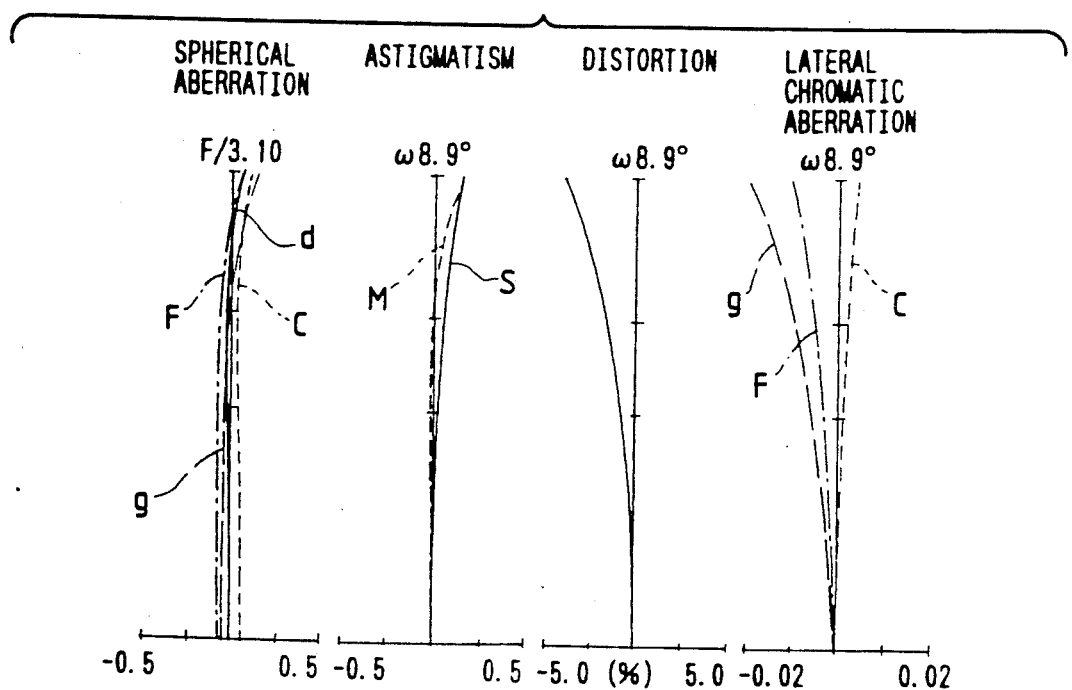
Figure 8:
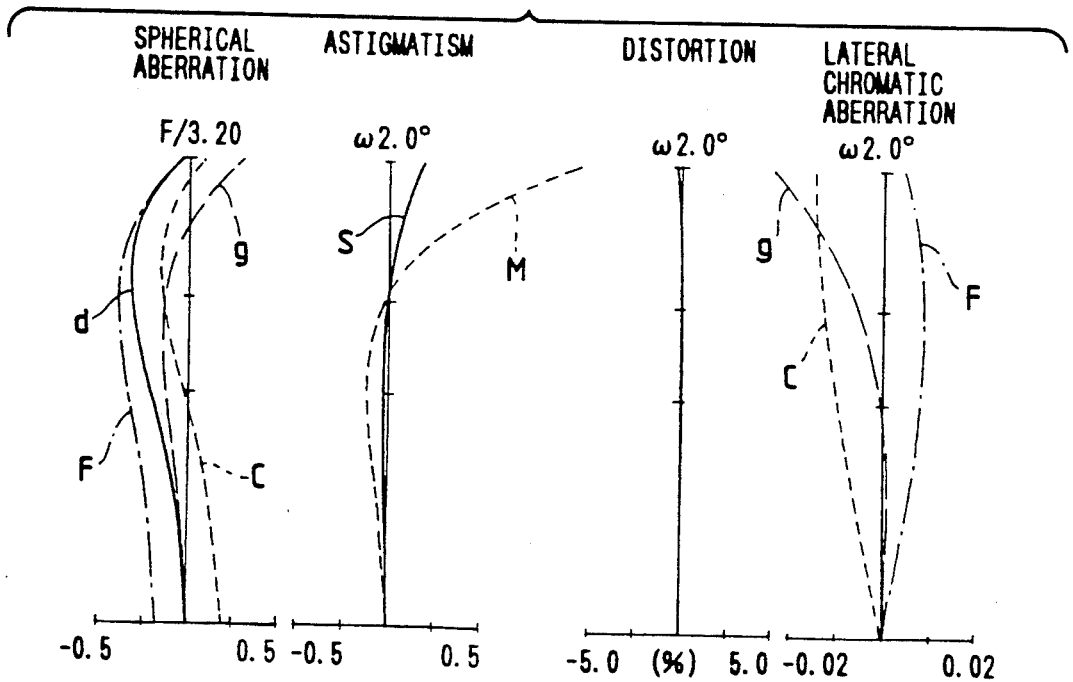

FIG. 4 shows the lens system which is composed by combining the embodiment of the attachment lens system according to the present invention with the master lens system described above. In the lens system illustrated in FIG. 4, the front lens unit ($r_1$ through $r_5$) of the master lens system is replaced with the attachment lens system so as not to change the location of the aperture stop.

This lens system is zoomed by moving the second lens unit of the attachment lens system with the first lens unit thereof kept fixed. The role of the so-called compensator, i.e., the function to compensate the deviation of the image surface to be caused by zooming, is imparted to the focusing subunit which is composed by the three lens elements arranged on the image side in the rear lens unit of the master lens system. Since this subunit is moved also for focusing, it has not only the role of the compensator but also the function for focusing. Accordingly, the subunit produces desirable effects for simplifying the mechanism of the attachment lens system, and controlling the displacements of the lens elements which are moved for focusing, etc.

In order to obtain a high zooming ratio, the embodiment of the present invention is designed so as to satisfy the following condition:

$$|\phi_2/\phi_1| > 4$$

wherein the reference symbols $\phi_1$ and $\phi_2$ represent the refractive powers of the first lens unit and the second lens unit respectively of the attachment lens system.

If the lower limit of this condition is exceeded, the second lens unit will have a weakened refractive power, thereby making it impossible to obtain a high zooming ratio of the attachment lens system. The embodiment is designed with $|\phi_2/\phi_1| = 7.43$ and has a high zooming ratio of approximately 20. When the embodiment is combined with a master lens system having a focal length of 12 mm, it provides a zooming range covering magnifications approximately from 0.5× to 10×.

Though the role of the compensator is imparted to the focusing subunit in the embodiment described above, it is possible to impart the role of the compensator to the first lens unit of the attachment lens system. In such a case, the first lens unit is moved non-linearly relative to the second lens unit. Further, focusing of the total photographic lens system is performed also by moving the first lens unit of the attachment lens system.

The attachment lens system according to the present invention has a negative refractive power as a whole and designed so as to compose a photographic zoom lens system having a high zooming ratio when combined with a master lens system.

I claim:

1. A photographic lens system, comprising:
   an attachment lens system comprising a first lens unit having a positive refractive power and a second lens unit having a negative refractive power; and
   a master lens system comprising a front lens unit having negative refractive power and a rear lens unit having a positive refractive power;
   said attachment lens system having a negative refractive power as a whole, and allowing variation of focal length of said attachment lens system by movement of at least one of said first lens unit and said second lens unit along the optical axis to vary an airspace reserved between said first lens unit and said second lens unit; and
   said attachment lens system includes means for attachment with the master lens system with said front lens unit removed and with said attachment lens system disposed so as to locate said first lens unit on the object side.

2. A photographic lens system according to claim 1, wherein said attachment lens system satisfies the following condition:

$$|\phi_2/\phi_1| > 4$$

wherein the reference symbols $\phi_1$ and $\phi_2$ represent the refractive powers of said first lens unit and said second lens unit respectively.

3. A photographic lens system according to claim 1 wherein the rear lens unit of said master lens system comprises lens elements to be moved for focusing said photographic lens system, said second lens unit is moved along the optical axis for varying focal length of said photographic lens system and said lens elements are moved also for compensating the deviation of the image surface caused by the variation of focal length.

* * * * *